June 7, 1932.  L. SAIVES  1,861,884
CHANGE SPEED DEVICE
Filed Nov. 19, 1931
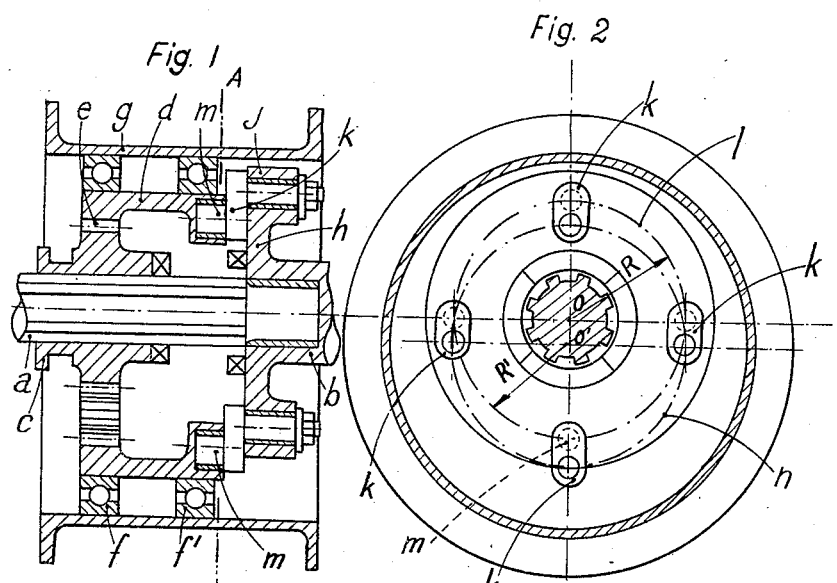
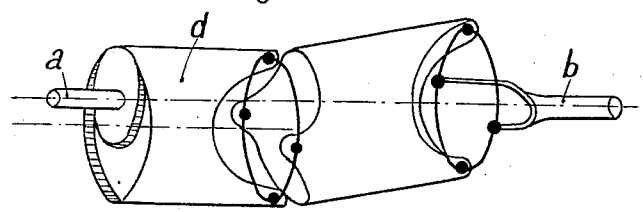
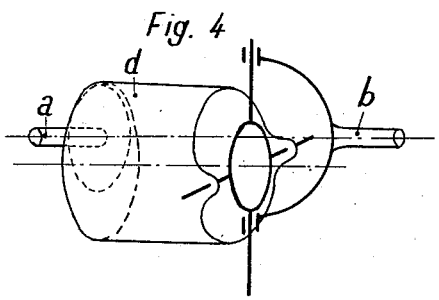

Patented June 7, 1932

1,861,884

UNITED STATES PATENT OFFICE

LÉON SAIVES, OF BILLANCOURT, FRANCE, ASSIGNOR TO LOUIS RENAULT, OF BILLANCOURT, FRANCE

CHANGE SPEED DEVICE

Application filed November 19, 1931, Serial No. 576,155, and in France December 6, 1930.

The present invention relates to change-speed devices, and is chiefly applicable in automobile manufacture, for the construction of change-speed boxes.

In the known change-speed boxes, the variations of the speed of the main driving shaft are obtained by transmitting the rotation to a second shaft by means of a pair of gear wheels, and then from this second shaft, by a like pair of wheels, to a third shaft having the same axis as the main shaft, and this arrangement requires two pairs of gear wheels for changing the speed.

The apparatus, the subject matter of the invention, relates to a mechanical device for the conversion of the speed of rotation of a shaft into a speed which is either above or below the same, the axis of the driven shaft being in line with the axis of the main shaft, said device comprising but a single pair of gear wheels.

In the accompanying drawing:

Figures 1 and 2 are respectively a longitudinal section and a cross section of an embodiment of the invention.

Figures 3 and 4 are diagrammatic views showing the connection between the two eccentric parts of the device.

Referring to Figures 1 and 2, Figure 1 is a longitudinal section, and Figure 2 a cross section on the line A—B of Figure 1, the member $d$ being removed.

$a$ is the driving shaft whose center is at O, and $b$ is the driven shaft, which has the same center line. On the driving shaft is mounted a pinion $c$ which engages the lower toothed part $e$ of a member $d$ which is eccentric with reference to the shaft $a$ and whose center is at $O^1$. Said member is mounted in two ball bearings $f$—$f^1$ which are secured to the casing $g$. According to this arrangement, when the shaft $a$ rotates, the pinion $c$ actuates the member $d$, which rotates in the same direction but at a less speed, this depending upon the number of teeth of the pinion and of the member $d$.

The problem thus consists in imparting the motion of the member $d$ to the driven shaft $b$. For this purpose, said shaft $b$ carries a disk $h$ provided with bosses $j$, which may be four in number. On each boss is mounted a small crank $k$ the eccentricity of whose journals is exactly the same as the eccentricity $O$ $O^1$ between the shaft $b$ and the member $d$. All of the said cranks are situated on a circumference $l$ whose center is at O and whose radius is R.

The other journals $m$ of said cranks are mounted in bored recesses which are formed in the member $d$ and are situated on a circumference $n$ whose center is at $O^1$ and whose radius is $R^1$. Due to this connection between the member $d$ and the shaft $b$, the cranks $k$ act as coupling links, and when the member $d$ rotates at a constant rate, it rotates the shaft $b$ at a constant rate of motion having the same direction and value.

Since the member $d$ rotates at a less speed than the shaft $a$, as above stated, it will follow that the motion of the shaft $a$ is imparted to the shaft $b$ according to the ratio between the number of teeth of the pinion and of the toothed part of the member $d$.

If it is desired to rotate the driven shaft at a greater speed than the driving shaft, it is simply necessary to use the shaft $b$ as the driving shaft and the shaft $a$ as the driven shaft.

Figure 3 is a diagrammatic view showing a modification of the connection between the eccentric member $d$ and the shaft $b$. In this case the motion of the member $d$ is imparted to the shaft $b$ by means of a double cardan device.

As shown in Figure 4, the motion of the eccentric member $d$ is imparted to the shaft $b$ by a sliding device of the Oldham type.

If the shaft $a$ is grooved or fluted, and if the pinion $c$ is displaced in such manner as to engage it with the disk $h$, this will effect the direct coupling of the driving and driven shafts by means of laterally extending clutch dogs.

The power transmission device as above disclosed may be used as an element of a change-speed box for motor vehicles, in order to obtain a noiseless speed changing.

I claim

A transmission mechanism for speed changing in automotive vehicles comprising a casing, an elongated member rotatably mounted in said casing and having an internal gear adjacent to one end thereof, a driving shaft and a driven shaft extending coaxially and longitudinally of each other from said casing and eccentric with respect to said elongated member, a pinion for cooperating with the internal gear on said elongated member slidingly mounted on one of said shafts and provided with laterally extending clutch dogs, a disk mounted on the other shaft having corresponding clutch dogs for cooperating with the clutch dogs on said sliding pinion when said pinion is moved inward in said elongated member and out of engagement with the internal gear thereof, and cranks the length of which are equal to the distance between the axis of the driving and driven shafts and the axis of the elongated member pivotally connected to said disk and to the end of said elongated member remote from said internal gear.

In testimony whereof he has signed this specification.

LÉON SAIVES.